Jan. 19, 1960  A. E. WHITECAR  2,921,665
DEVICE FOR SPACING ARTICLES
Filed March 1, 1956  6 Sheets-Sheet 1
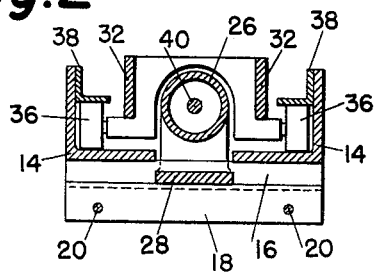
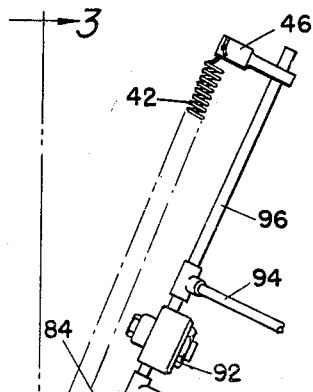
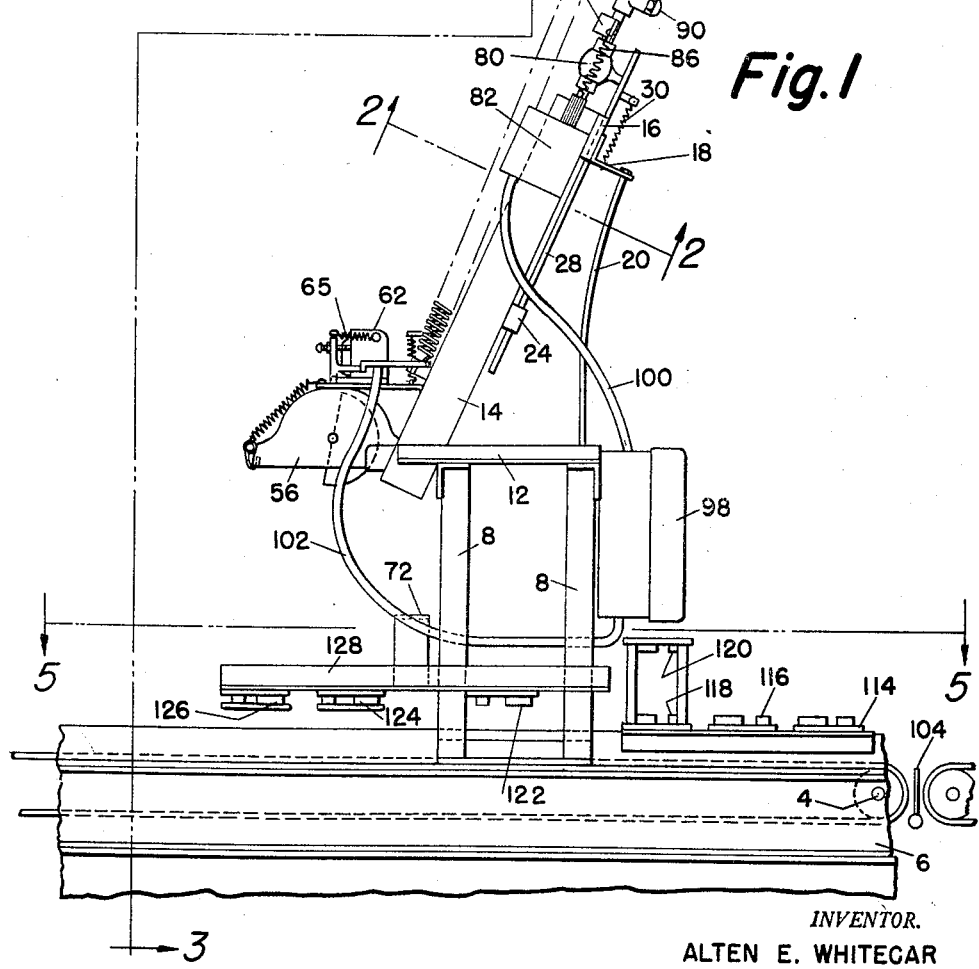
INVENTOR.
ALTEN E. WHITECAR
BY
ATTORNEYS Jan. 19, 1960 A. E. WHITECAR 2,921,665
DEVICE FOR SPACING ARTICLES
Filed March 1, 1956 6 Sheets-Sheet 2

INVENTOR.
ALTEN E. WHITECAR
BY
ATTORNEYS

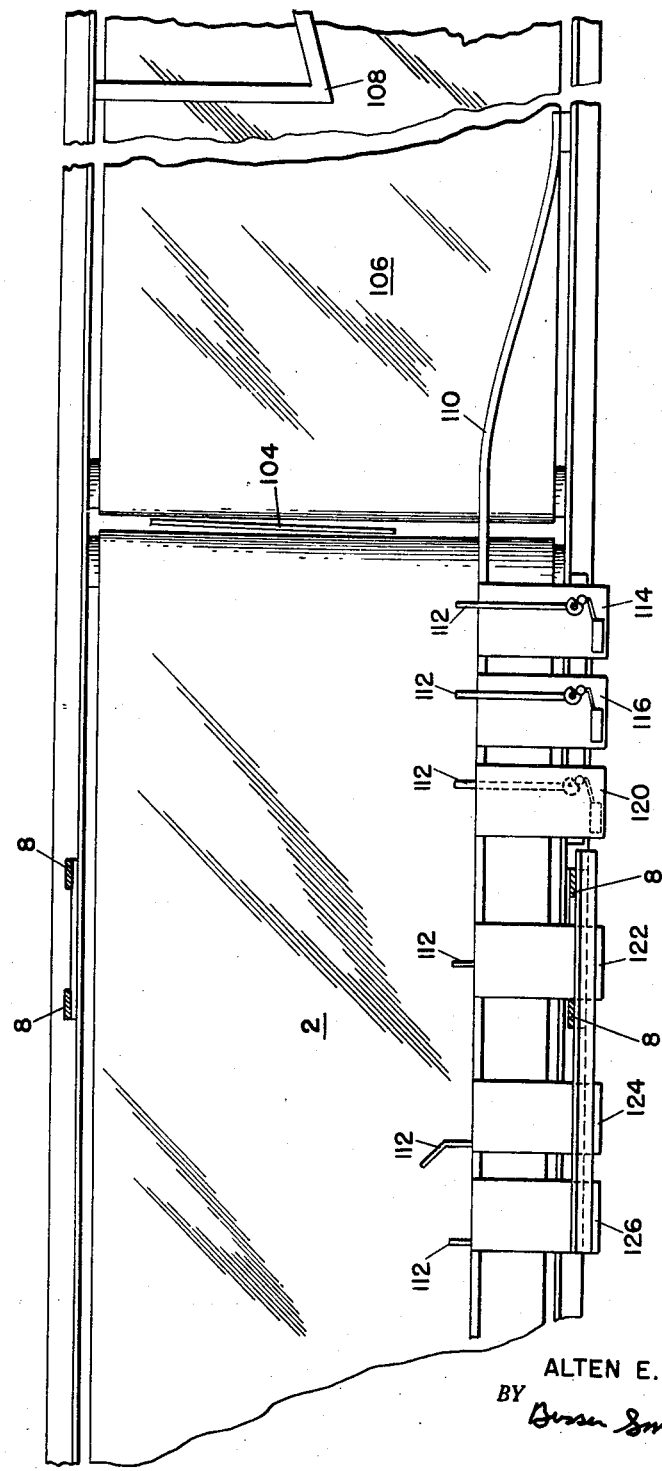

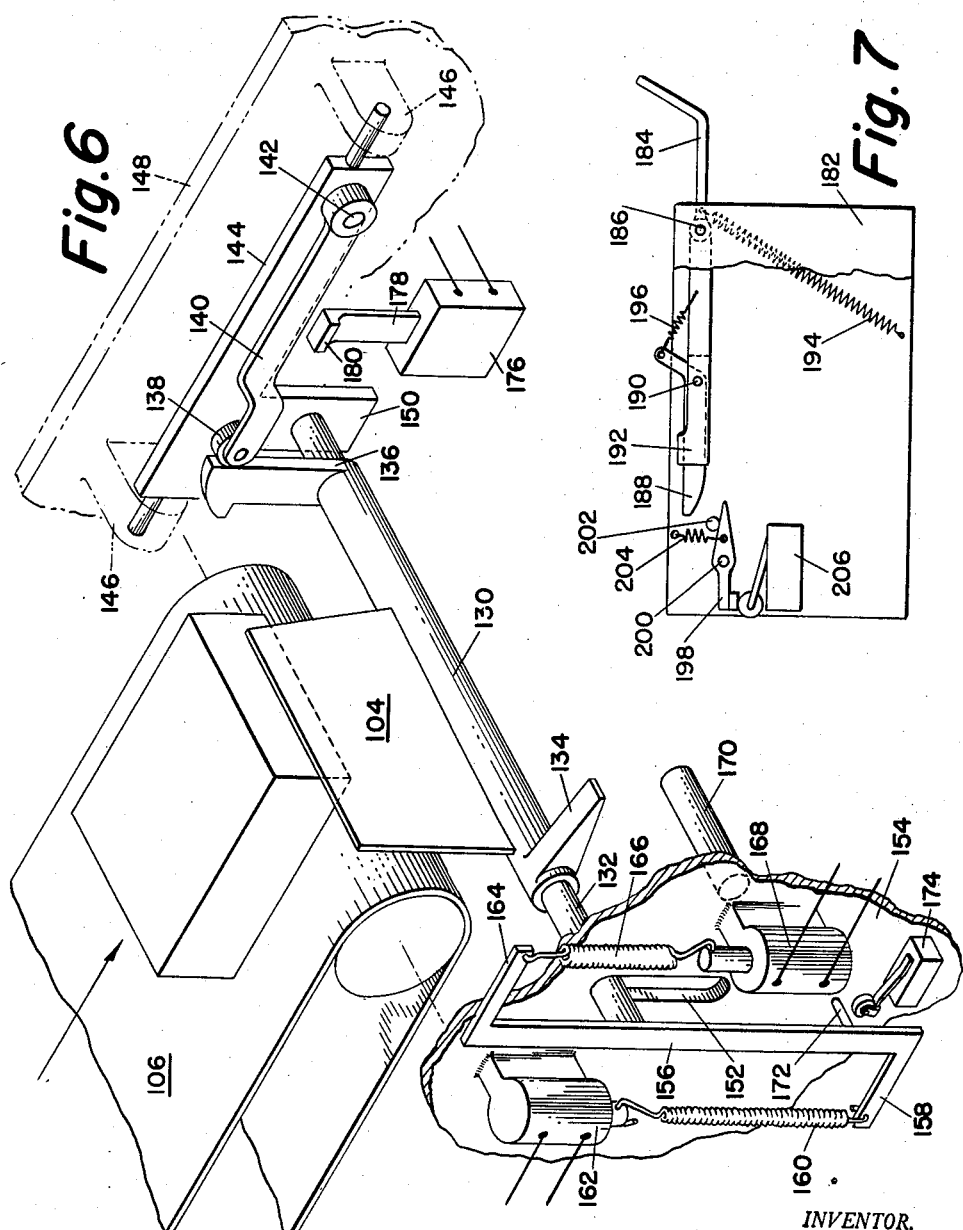

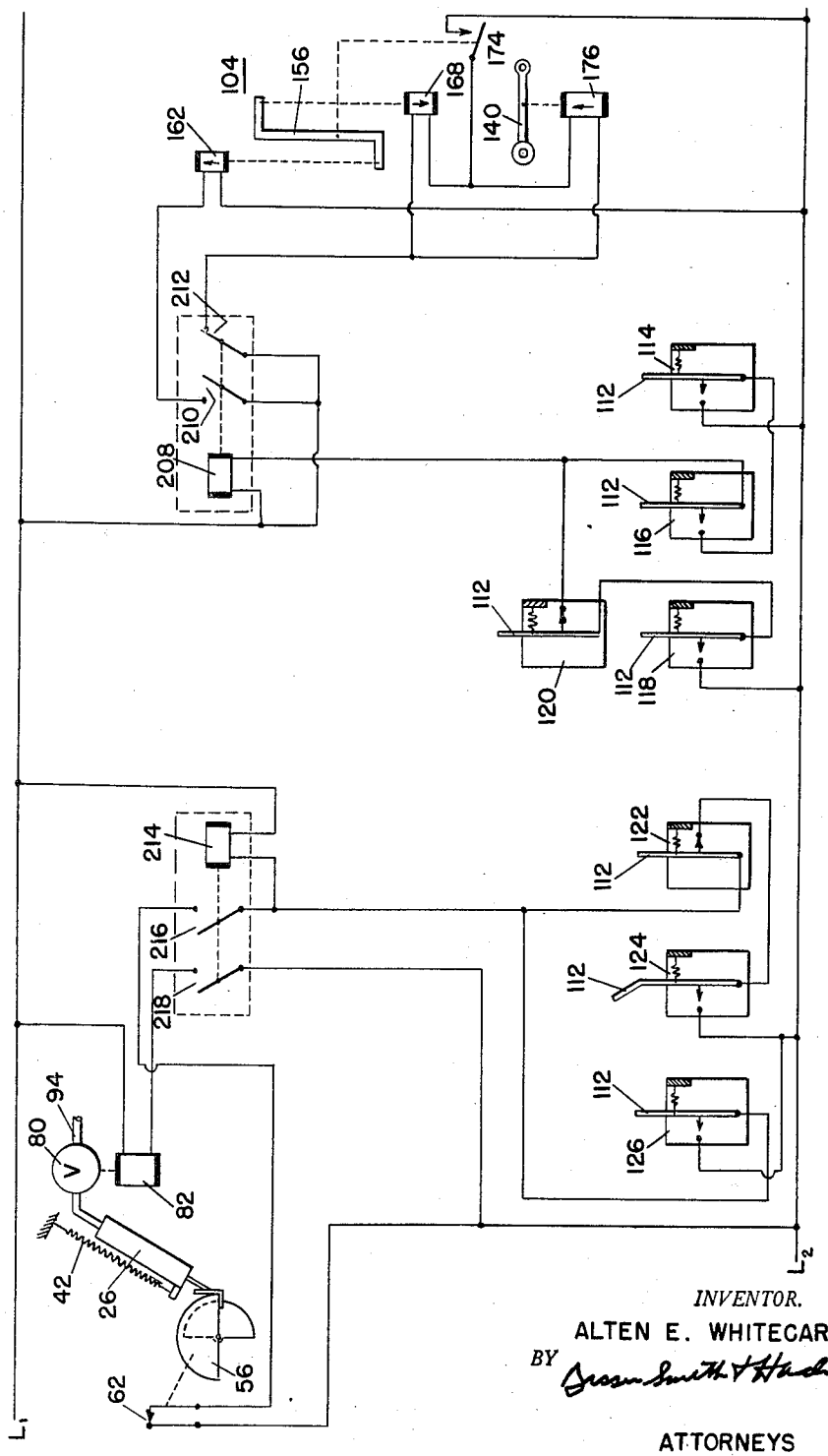

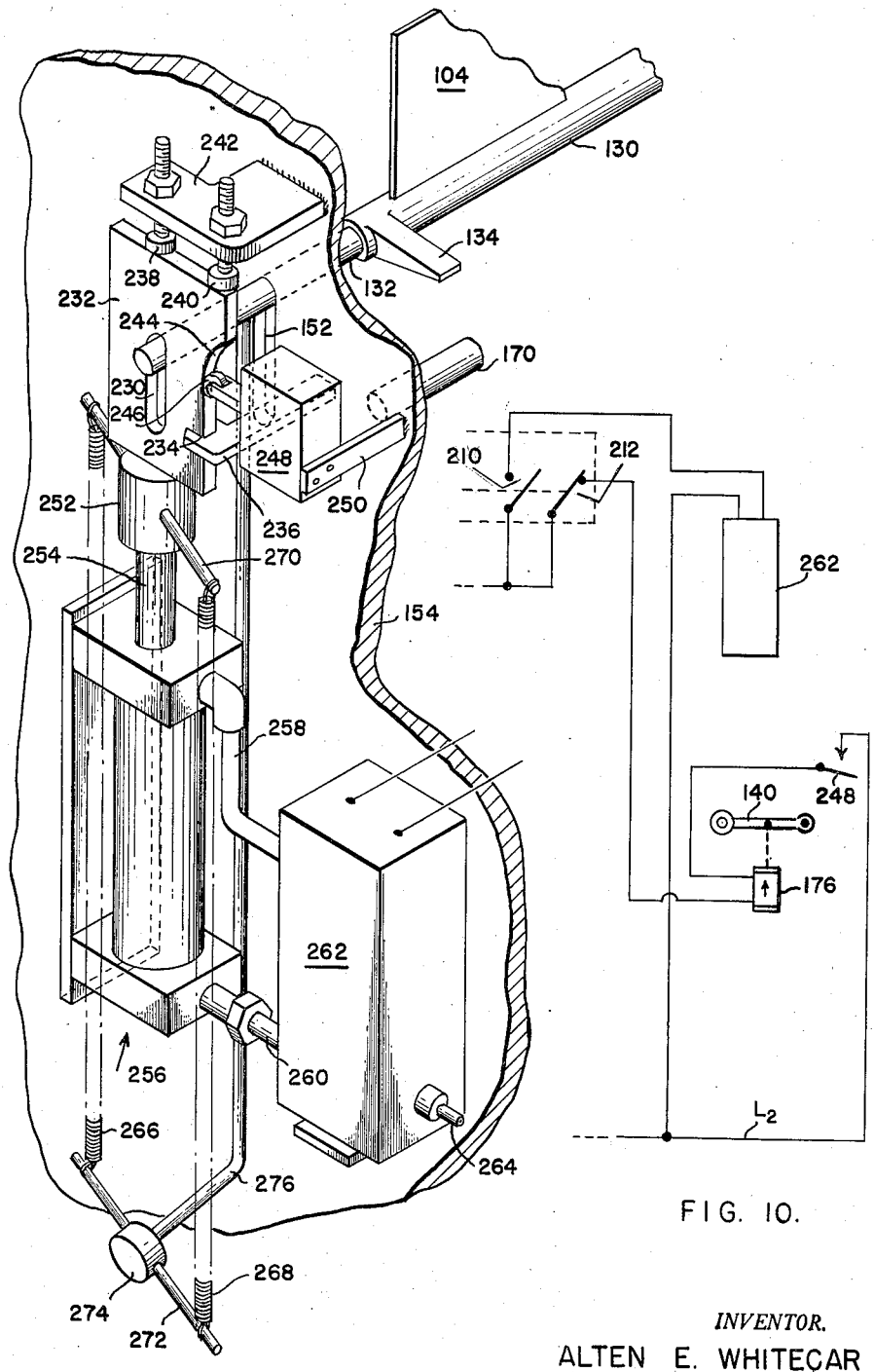

United States Patent Office 2,921,665
Patented Jan. 19, 1960

2,921,665

DEVICE FOR SPACING ARTICLES

Alten E. Whitecar, Westville, N.J., assignor to Smith, Kline & French Laboratories, Philadelphia, Pa., a corporation of Pennsylvania Application March 1, 1956, Serial No. 568,923

13 Claims. (Cl. 198—34)

This invention relates to a device for spacing articles. It more particularly relates to such a device useful in association with conveying means.

It is a broad object of this invention to provide a device for spacing articles which are being conveyed, for example, on a pair of conveyor belts.

It is a further object of this invention to provide a device for spacing articles which has a retractable barrier.

An additional object of this invention is to provide a barrier for spacing articles having means to introduce the barrier between closely spaced articles.

Another object of this invention is to provide a retractable barrier spacing device having means to facilitate the retraction of the barrier by relieving the pressure on the barrier by an article arrested by the barrier.

The spacing device in accordance with this invention is useful in association with a wide variety of devices. In order to particularly illustrate the utility of the device of this invention, it will be described as used in association with printing mechanism. This application is a continuation-in-part of my application, Serial No. 255,291, filed November 7, 1951, now Patent No. 2,748,695, in which I have claimed the printing mechanism described herein.

Referring now to the accompanying drawings:

Figure 1 is a side view of a printing mechanism as it appears in relation to a barrier used in conjunction therewith;

Figure 2 is a sectional view taken on line 2—2 of Figure 1;

Figure 5 is a view taken on line 5—5 of Figure 1;

Figure 6 is an isometric view of the barrier and operating mechanism therefor;

Figure 7 is a detail view of a momentary contact switch;

Figure 8 is a wiring diagram for the combined barrier and printing mechanisms;

Figure 9 is an isometric view of alternative operating mechanism for the barrier; and Figure 10 is a wiring diagram showing necessary modifications of the wiring diagram of Figure 8 for the employment of the barrier operating mechanism of Figure 9.

Figure 3:
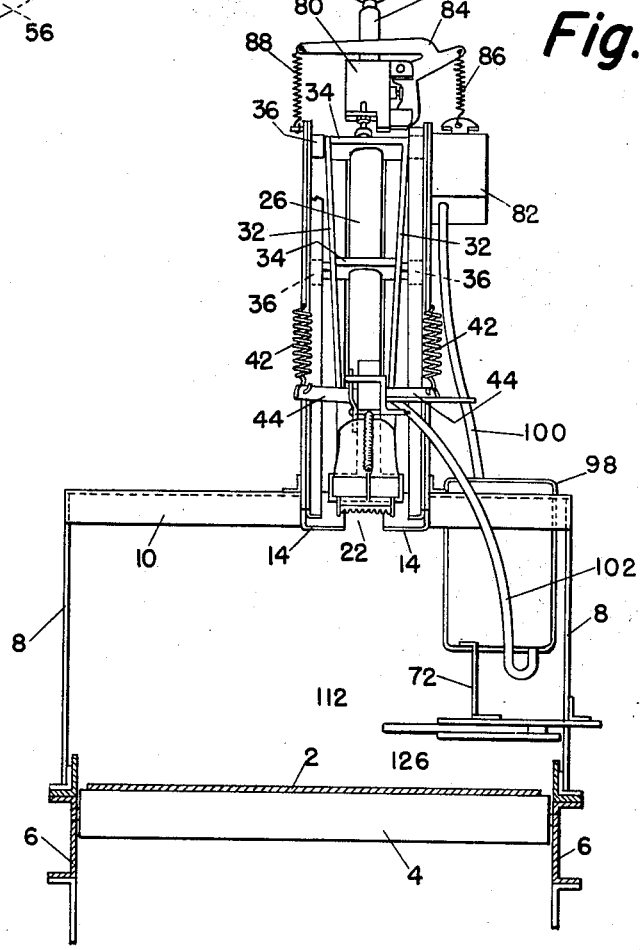
Figure 3 is a view taken on line 3—3 of Figure 1.

Referring specifically to Figures 1 and 3, a conveyor belt 2 is supported on a roll 4, said roll being supported by side rails 6. Mounted on side rails 6 are brackets 8, said brackets 8 supporting cross members 10 at their upper ends. Mounted on cross members 10 are supporting brackets 12, said brackets 12 supporting rails 14 at their left-hand end, as viewed in Figure 1. Rails 14 are mounted at an angle to compensate for the speed of travel of conveyor 2. Secured to the upper ends of rails 14 is a plate 16, having a bracket 18 secured thereto, said bracket 18 being secured to bracing rod 20, which is secured at its lower end to a cross member 10. Block 24 is secured to rails 14. Member 28 is secured at its upper end to valve 80 and slides in plate 16 and block 24. Member 28 may slide in plate 16 and block 24 through a limited distance against the action of tension spring 30.

Frame members 32 are secured together by cross members 34, said members 32 and 34 being supported on rollers 36, said rollers 36 traveling on tracks formed by rails 14 and cooperating brackets 38 mounted on rails 14 above rollers 36. Frame members 32 and 34 are moved downwardly by piston rod 40, shown in Figure 2. Piston rod 40 is secured to the lower ends of frame members 32. Tension springs 42, which are secured to brackets 44 at their lower ends, and to bracket 46 at their upper ends, serve to continually bias frame members 32 and 34 in an upward direction.

Figure 4:
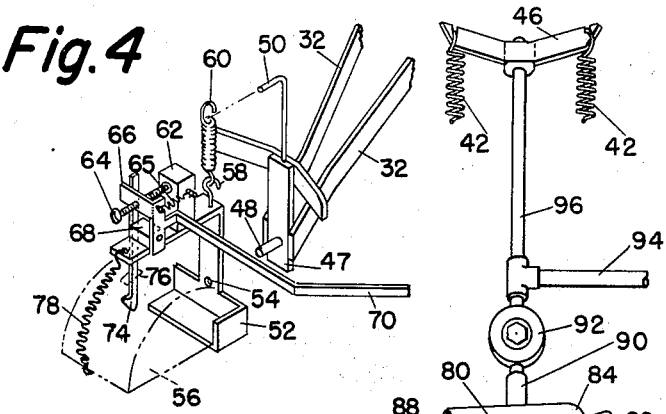
Figure 4 is an exploded isometric view of the support for a rotatable printer.

Mounted at the lower ends of frame members 32, as best seen in Figure 4, is a support for a rotatable printer, such as an Algene printer, although it will be appreciated that any other similar type of printer can also be used. Mounted between frame members 32 is a vertical plate 47 having a pin 48 projecting from the front thereof, and an L-shaped bracket 50 mounted on the top thereof. Member 52 holds one end of the rotatable printer and has a hole 54 therein through which pin 48 projects to support member 52 and printer 56. Member 52 has a hook 58 on the top thereof, said hook 58 engaging a tension spring 60, said tension spring 60 engaging L-shaped bracket 50 at its upper end. Thus it is seen that member 52 is pivotally supported on pin 48. Member 52 may be secured on pin 48 by a collar, for example. The pivotal mounting of member 52 permits the printer to conform to an uneven surface. Also mounted on the top of member 52 is a micro-switch 62. Micro-switch 62 is operated by an adjustable screw 64 which projects through member 66, said member 66 being rotatably pinned to a bracket 68 at its lower end. Adjustable screw 64 is held in engagement with micro-switch 62 by tension spring 65. Member 66 has an arm 70 projecting therefrom, said arm 70 engaging bracket 72 at the extreme lower limit of travel of frame members 32 and 34 and printer 56 in order to prevent printer 56 from striking conveyor 2. Also rotatably pinned to bracket 68 is an arm 74 which abuts against member 66 and which projects through aperture 76 in the casing of printer 56. The purpose of arm 74 is to operate micro-switch 62 through screw 64 when the rotatable printer has made one revolution, and in so doing trips arm 74. Printer 56 is held against member 52 by tension spring 78.

Referring again to Figures 1 and 3, an air valve 80 is mounted adjacent the top of air cylinder 26. Air valve 80 is operated by a solenoid 82 which is connected to air valve operating lever 84 by spring 86. Air valve operating lever 84 is biased toward the closed position by spring 88. Mounted above air valve 80 are volume control 90, pressure control 92 and air inlet line 94, which may be connected at its opposite end to any convenient source of compressed air. Pipe 96 extends above air inlet line 94 and supports bracket 46.

Mounted on the right-hand end of cross member 10, as viewed in Figure 1, is a control box 98 having line 100 connected thereto at one end and to solenoid 82 at its opposite end, and line 102 connected thereto at one end and connected to micro-switch 62 at its opposite end.

Referring now more particularly to the embodiments of this invention, a barrier gate 104 is mounted adjacent conveyor roller 4 as shown in Figure 1. As best shown in Figure 5, barrier gate 104 is mounted between conveyor 2 and an additional conveyor 106 which conveys containers, such as boxes, from right to left, as viewed in Figure 5. It will be appreciated that a single conveyor could be employed in lieu of two conveyors by, for example, passing a single reach of a conveyor below and around the barrier gate assembly. This may be accomplished, for example, by means of rolls, positioned below the barrier gate, which engage the conveyor. Mounted above conveyor 106 are guide rails 108 and 110 which serve to properly position a container traveling on conveyors 106 and 2 so that they will properly approach barrier gate 104 and will, after passing barrier gate 104, trip switch arms 112 on switches 114, 116, 118, 120, 122, 124 and 126. As will be seen from Figure 1, switch 120 is mounted directly above switch 118 for a purpose to be hereinafter described. Switches 114, 116, 118, 120 and 122 are conventional cam actuated micro-switches. Switches 124 and 126 are special momentary contact switches and will be hereinafter described in detail. As will be seen from Figure 1, switches 122, 124 and 126 are supported by bracket 128 secured to upstanding brackets 8.

Referring specifically to Figure 6, the barrier and operating mechanism therefor are shown and consist of barrier gate 104 which is mounted at an angle on member 130. The purpose of mounting barrier gate 104 at an angle on member 130 is to prevent shifting of the container when the container abuts the barrier gate since the container will abut the barrier gate at an angle, due to the conformation of guide rail 110. Preferably the angle between the gate 104 and guide rail 110 is about 90°. Member 130 is rotatably mounted on rod 132 and has wedge shaped arm 134 formed integrally therewith and projecting from the front thereof. Also formed integrally with member 130 is arm 136 which engages roller 138, said roller 138 being pinned to arm 140, said arm 140 being rotatably supported at its right-hand end, as viewed in Figure 6, as shown at 142. Arm 140 is supported by plate 144, said plate 144 being pivotally mounted in brackets 146, said brackets 146 being secured to stationary side rail 148.

Member 132 is fixedly secured to plate 150 which is formed integrally with plate 144 at its right-hand end, as viewed in Figure 6. Member 132 at its left-hand end may reciprocate in slot 152 formed in stationary side rail 154, and has bracket 156 secured to the end thereof. Bracket 156 has an arm 158 at its lower end, having spring 160 secured thereto, said spring engaging solenoid 162 at its upper end. Bracket 156 also has arm 164 at its upper end, having spring 166 secured thereto, said spring 166 being secured to solenoid 168 at its lower end. Mounted adjacent solenoid 168 on the opposite side of stationary side rail 154 is projecting bar 170 which is arranged so that wedge shaped arm 134 engages bar 170 when rod 132 travels downwardly in slot 152. Bracket 156 also has arm 172 projecting therefrom, which operates micro-switch 174 when rod 132 and bracket 156 move downwardly.

Mounted below member 140 is the latch release for barrier gate 104 consisting of solenoid 176 having arm 178 projecting upwardly therefrom, said arm 178 being provided with a rubber bumper 180 at the top thereof which engages the underside of arm 140.

Referring to Figure 7, a momentary contact switch is shown which is the type shown at 124 and 126 in the drawings and which permits a momentary contact to be made with a conventional micro-switch, irrespective of the length of a container which may be passing the switch. The switch consists of a base member 182 having an arm 184 pivotally connected thereto, as shown at 186. A second arm 188 is pivotally mounted on arm 184, as shown at 190. Arm 184 is U-shaped at its left-hand end, as viewed in Figure 7, as shown at 192, and encircles arm 188 on three sides thereof. Arms 184 and 188 are biased clockwise, as viewed in Figure 7, by springs 194 and 196, respectively.

Mounted on the left-hand side of base member 182 is arm 198, said arm 198 being pivotally mounted, as shown at 200. Arm 198 is held in engagement with pin 202 by spring 204. Arm 198, at its left-hand end, engages the actuating lever of a conventional micro-switch 206. Thus it is seen that when lever 184 is rotated counterclockwise, as viewed in Figure 7, lever 188 is also rotated counterclockwise, and in rotating, rotates arm 198 clockwise thus tripping micro-switch 206. When arms 184 and 188 return to their original position, i.e., rotate clockwise, arm 188 rides over the stationary end of arm 198 which is held by pin 202. Thus a complete operation of the switch assembly trips micro-switch 206 only once.

*Operation*

The operation of the above disclosed embodiment of this invention will be described in conjunction with the printing mechanism, particular reference being made to Figure 8. As a container, such as a rectangular cardboard box, proceeds from right to left on conveyors 106 and 2, as viewed in Figures 1 and 5, it will first close switch 114 in the barrier operating circuit. The closing of switch 114 alone has no effect, but when the box proceeds to close switch 116 while, at the same time, holding switch 114 closed, relay 208 is energized, thus closing contact 210 and opening contact 212. Closing contact 210 energizes solenoid 162, as best shown in Figure 6, which lifts barrier gate 104. When barrier gate 104 is in the raised position, as shown in Figure 6, a succeeding container is prevented from proceeding from conveyor 106 to conveyor 2 until the barrier gate is lowered. Spring 160 is of insufficient strength to lift a container when spring 160 is raised by solenoid 162 and a container is passing over barrier gate 104. Conveyor 106 is mounted slightly lower than conveyor 2 so that barrier gate 104, by dragging the bottom of a container, will abut against the next adjacent container, irrespective of whether there is any clearance between the containers or not.

If the box has a relatively small height it will proceed to close switch 118, maintaining current to relay 208 after switches 114 and 116 return to their original position. A high box opens switch 120, which will deenergize relay 208, as soon as the end of the box passes switch 114. This energizes solenoid 168, pulling barrier gate 104 down and also energizes solenoid 176 to trip the latching mechanism on barrier gate 104.

It will be appreciated that a smaller interval is required between a high box and the next adjacent box. This results from the fact that less time is required for the printing head to return after printing a high box. As a result of the employment of a smaller interval between the high boxes, the production rate is increased.

It will be seen, by referring to Figure 6, that when arm 178 on solenoid 176 raises latching lever 140, the pressure of the container against barrier gate 104 causes it to rotate clockwise, as viewed in Figure 6, thus falling away from contact with the container. At the same time, rod 132 is pulled downwardly in slot 152 while supporting member 144 pivots in brackets 146. As gate 104 rotates clockwise and is pulled downwardly, projection 134 engages stud 170 so that when the rod 132 is in the low position in slot 152, the gate 104 will be made to stand upright. When the gate 104 is returned to its upright position, the lowering of latch lever 140 by solenoid arm 178 will lock the gate in the vertical position. Thus, when the gate is raised by a succeeding action of solenoid 162, it will also be vertical in the raised position.

As the barrier gate 104 is pulled downwardly by solenoid 168, solenoids 168 and 176 will remain energized until arm 172 on the barrier mechanism opens switch 174. This action occurs when the gate is in the fully depressed position and the opening of switch 174 resets the latch mechanism.

It is obvious that while the barrier mechanism has been described in conjunction with a printing mechanism that it could also be used for any other application where it is desired to have a measured distance between a series of containers traveling on a conveyor belt.

As the box proceeds on conveyor belt 2 it opens switch 122 and closes switch 124. If the box is long enough to hold switch 122 open, there is no effect on the circuit. If the box is short and switch 122 is closed, switch 124 energizes relay 214 thus closing contacts 216 and 218 and energizing solenoid 82 on the printing mechanism. When solenoid 82 on the printing mechanism is energized, air valve 80 is opened and the printer 56 is moved downwardly by the admission of compressed air to cylinder 26. When the printer 56 engages the box, the movement of the box beneath the printer will cause a rotation of the rotary printer which will then print the desired address on the container. Valve 80 remains open until switch 62 in the holding circuit through contact 216 is opened. Springs 42 then retract the printing mechanism.

With a long box having no effect when switch 122 is opened and switch 124 is closed, switch 126 will energize relay 214 and the printing cycle operates as above described.

It will be appreciated that if the box is printed adjacent to the front end thereof, the appearance is not as desirable as when the box is printed near the center. Therefore, the ability of the machine to print in two positions results in a neater appearance where long and short boxes are printed in succession.

The distance between switches 124 and 126 is critical and is governed by the maximum printing length of the rotating head in the printing device. Since switch 126 always operates, it must be closed before switch 62 is opened, or a double printing would be made. As will be seen from Figure 4, switch 62 is operated by the rotation of the rotary printer striking arm 74, causing adjustable screw 64 to operate micro-switch 62.

Switches 124 and 126 are special momentary contact switches, shown in detail in Figure 7. Thus it will be seen that irrespective of the length of the box passing switches 124 and 126, a momentary contact only is made by the conventional micro-switches 206 employed in the assemblies of these two switches.

In Figure 9 there is illustrated an alternative operating mechanism for swinging rod 132 and barrier gate 104 downwardly. As shown in Figure 9, rod 132, after passing through slot 152 in side rail 154, passes through a slot 230 in a vertical plate 232. Plate 232 is guided by a slot 234 in bracket 236 which is secured to side rail 154. The upward travel of plate 232 is limited by stops 238 and 240 which are bolted to a bracket 242 secured to side rail 154.

Plate 232 has a cam face 244 which is adapted to engage cam follower roller 246 of micro-switch 248. Switch 248 is simply a substitute for switch 174 used in association with the previously described operating mechanism. Switch 248 is secured to side rail 154 by bracket 250.

The bottom of plate 232 is secured to hub 252 which is mounted on piston rod 254 of air operated ram 256. Ram 256 is connected to air lines 258 and 260 which are, in turn, connected to solenoid valve 262. Valve 262 is supplied with compressed air by line 264 which is connected to a suitable source of compressed air (not shown).

Tension springs 266 and 268 have their upper ends respectively secured to the ends of crossbar 270 which is secured to hub 252 and have their lower ends respectively secured to crossbar 272 which is secured to hub 274. A substantially L-shaped rod 276 has its lower end welded to hub 274 and its upper end secured to rod 132.

Only a small modification of the wiring diagram of Figure 8 is requisite for the operation of the mechanism of Figure 9. These modifications are shown in Figure 10. It will be noted that solenoid valve 262 is simply substituted for the solenoid 162 shown in Figure 8 and thus is connected to power line L₂ and contact 210. Solenoid 168, which is shown in Figure 8, is eliminated. Switch 248 is simply substituted for switch 174 of the first described operating mechanism of Figure 8.

The operation of this alternative operating mechanism for the barrier gate is similar to the operation of the originally described operating mechanism employing solenoids. When, as hereinbefore described, relay 208 is deenergized, contact 212 is closed energizing solenoid 176 since switch 248 is held closed by plate 132. This releases latching lever 140 and permits the pressure of the container against barrier gate 104 to rotate it clockwise as previously described. Control valve 262 is deenergized due to contact 210 being opened and causes air to flow into ram 256 so as to move piston rod 254 and plate 232 downwardly. Plate 232 in turn swings rod 132 downwardly causing plate 144 to pivot. It will be noted that rod 276 is spaced sufficiently far from side rail 154 to permit this pivoting without interference from side rail 154.

Again, as plate 232 travels downwardly, cam face 244 cams roller 246 to effect the opening of switch 248 thus permitting latching lever 140 to drop downwardly onto arm 136. Again, as previously described, as gate 104 is pulled downwardly, projection 134 engages stud 170 to rotate gate 104 into an upright position and permit lever 140 to drop into position to lock arm 136 in the upright position.

When relay 208 is energized, contact 212 opened and contact 210 closed, solenoid valve 262 is reversed causing the flow of air to ram 256 to be reversed and, in turn, causing the ram to raise plate 232 against stops 238 and 240. Due to the presence of slot 230, the upward movement of plate 232 does not result in swinging rod 132 upwardly. The raising of plate 232 results in cam surface 244 closing switch 248. Rod 132 is moved upwardly by the tension springs 266 and 268 acting through rod 276. If gate 104 is raised upwardly against the bottom of a container, the springs 266 and 268 are of insufficient strength to lift the container.

Various modifications of the invention will be apparent to those skilled in the art, and the scope of the present invention is to be restricted only in accordance with the appended claims.

What is claimed is:

1. A barrier for a conveyor comprising a member mounted for movement transversely to the conveyor run, a gate rotatably secured to said member, latch means to selectively release said gate for rotation by an object being conveyed, means to move said member transversely to the conveyor run, said means being adapted to directly engage said member for movement into an inactive position and including resilient means connecting said second mentioned means and said member to transmit the return movement to the active position from said second mentioned means to said member.

2. A barrier for a conveyor comprising a support mounted for movement transversely to the conveyor run, a gate mounted on said support, and means including a pair of oppositely acting solenoids each connected to said support by means including a tension spring to move said support transversely and substantially perpendicularly to the conveyor run.

3. A barrier for a conveyor comprising a member pivotally supported at one end for movement transversely to the conveyor run, means including a pair of oppositely acting solenoids each connected to said member by means including a tension spring to pivot said member and a gate secured to said member.

4. A barrier for a conveyor comprising a member pivotally supported at one end for movement transversely to the conveyor run, means to pivot said member including resilient means to selectively bias said member to the active position, a gate rotatably secured to said member and latch means to selectively release said gate for rotation on said member by an object being conveyed.

5. A barrier for a conveyor comprising a member pivotally supported at one end for movement transversely to the conveyor run, means including a pair of oppositely acting solenoids each connected to said member by means including a tension spring to pivot said member, a gate rotatably secured to said member and latch means to selectively release said gate for rotation on said member by an object being conveyed.

6. A barrier for a conveyor comprising a member pivotally supported at one end for movement transversely to the conveyor run, a double acting ram, means connected to said ram and adapted to engage said member for downward movement, means including a tension spring connecting said ram to said member to transmit the upward movement of said ram to said member, a gate rotatably secured to said member and latch means to selectively release said gate for rotation on said member by an object being conveyed.

7. A barrier for a conveyor comprising a member pivotally supported at one end for movement transversely to the conveyor run, means including a pair of oppositely acting solenoids each connected to said member by means including a tension spring to pivot said member, a gate rotatably secured to said member, latch means to selectively release said gate for rotation by an object being conveyed and means to rotate said gate in the reverse direction to a substantially upright position.

8. A barrier for a conveyor comprising a member pivotally supported at one end for movement transversely to the conveyor run, a double acting ram, means connected to said ram and adapted to engage said member for downward movement, means including a tension spring connecting said ram to said member, a gate rotatably secured to said member, latch means to selectively release said gate for rotation by an object being conveyed and means to rotate said gate in the reverse direction to a substantially upright position.

9. A barrier adapted to space objects on a conveyor comprising a support mounted for movement transversely to the conveyor run, a gate mounted on said support, a pair of oppositely acting solenoids each resiliently connected to said support to move said support transversely to the conveyor and switch means in position to be engaged by an article being conveyed and controlling the energizing of said solenoids to provide the desired spacing between the articles being conveyed.

10. A barrier for a conveyor comprising a member mounted for movement transversely to the conveyor run, a gate rotatably secured to said member, latch means to selectively release said gate for rotation by an object being conveyed, means to so move said member, said means being adapted to move said member to position the gate into an inactive position and adapted to resiliently urge said member to position the gate into an active position.

11. A barrier for a conveyor comprising a member mounted for movement transversely to the conveyor run, a gate rotatably secured to said member, latch means to selectively release said gate for rotation by an object being conveyed, a double acting ram, means connected to said ram and adapted to engage said member to move said member to position the gate into an inactive position when the ram is moved in one direction, and resilient means connecting said ram to said member to resiliently urge said member to position the gate into an active position when the ram is moved in the opposite direction.

12. A barrier in accordance with claim 11 in which the resilient means includes a tension spring.

13. A barrier for a conveyor comprising a member mounted for movement transversely to the conveyor run, a gate rotatably secured to said member, latch means to selectively release said gate for rotation by an object being conveyed, a double acting ram, means connected to said ram and adapted to engage said member to move said member to position the gate into an inactive position when the ram is moved in one direction, resilient means connecting said ram to said member to resiliently urge said member to position the gate into an active position when the ram is moved in the opposite direction, and a solenoid valve controlling the movement of said ram and the switch means in position to be engaged by an article being conveyed and controlling the energizing of said solenoid valve to provide the desired spacing between the articles being conveyed.

References Cited in the file of this patent

UNITED STATES PATENTS

| 1,904,613 | Braren | Apr. 18, 1933 |
| 2,036,863 | Dupuy | Apr. 7, 1936 |
| 2,638,203 | Mayer | May 12, 1953 |
| 2,761,545 | Hoagland | Sept. 4, 1956 |